(12) United States Patent  (10) Patent No.: US 8,778,852 B2
Huang  (45) Date of Patent: Jul. 15, 2014

(54) BREAKING VISCOELASTIC SURFACTANT GELLED FLUIDS USING BREAKER NANOPARTICLES

(75) Inventor: Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 129 days.

(21) Appl. No.: 13/357,400

(22) Filed: Jan. 24, 2012

(65) Prior Publication Data

US 2013/0190215 A1 Jul. 25, 2013

(51) Int. Cl.
*C09K 8/16* (2006.01)
*C09K 8/22* (2006.01)

(52) U.S. Cl.
USPC .......................................... 507/272; 507/240

(58) Field of Classification Search
None
See application file for complete search history.

(56) References Cited

U.S. PATENT DOCUMENTS

| | | | |
|---|---|---|---|
| 6,881,709 B2 * | 4/2005 | Nelson et al. | 507/203 |
| 7,052,901 B2 | 5/2006 | Crews | |
| 7,347,266 B2 | 3/2008 | Crews et al. | |
| 7,595,284 B2 | 9/2009 | Crews | |
| 7,645,724 B2 | 1/2010 | Crews | |
| 7,967,068 B2 | 6/2011 | Huang et al. | |
| 8,056,630 B2 | 11/2011 | Huang et al. | |
| 8,101,557 B2 | 1/2012 | Crews et al. | |
| 2008/0153720 A1* | 6/2008 | Huang et al. | 507/271 |
| 2008/0271888 A1 | 11/2008 | Huang et al. | |
| 2009/0192053 A1 | 7/2009 | Crews et al. | |
| 2010/0261624 A1 | 10/2010 | Crews et al. | |
| 2011/0224110 A1 | 9/2011 | Huang et al. | |
| 2011/0253365 A1 | 10/2011 | Crews et al. | |

* cited by examiner

*Primary Examiner* — Susannah Chung
*Assistant Examiner* — Kumar R Bhushan
(74) *Attorney, Agent, or Firm* — Mossman, Kumar & Tyler, P.C.

(57) ABSTRACT

Breaker nanoparticles may be added to gelled aqueous fluids where the gelled aqueous fluid may include an aqueous base fluid, e.g. a drilling fluid, gelled with at least one viscoelastic surfactant (VES) in an amount to increase the viscosity of the aqueous base fluid. The addition of the breaker nanoparticles may reduce the viscosity, or break the gel, of the gelled aqueous fluid by the direct or indirect action of the breaker nanoparticles. The breaker nanoparticles may be or include, but are not limited to inorganic semiconductor particles, organic semiconductor particles, and combinations thereof. The inorganic semiconductor particles may be or include, but are not limited to cupric oxide, cuprous oxide, silicon, silicon carbide, germanium, and gallium arsenide, indium antimonide, gallium nitride, and combinations thereof; wherein the organic semiconductors selected from the group consisting of pentacene, anthracene, rubrene, poly(3-hexylthiophene), poly(p-phenylene vinylene), polypyrrole, polyaniline, and combinations.

9 Claims, 2 Drawing Sheets

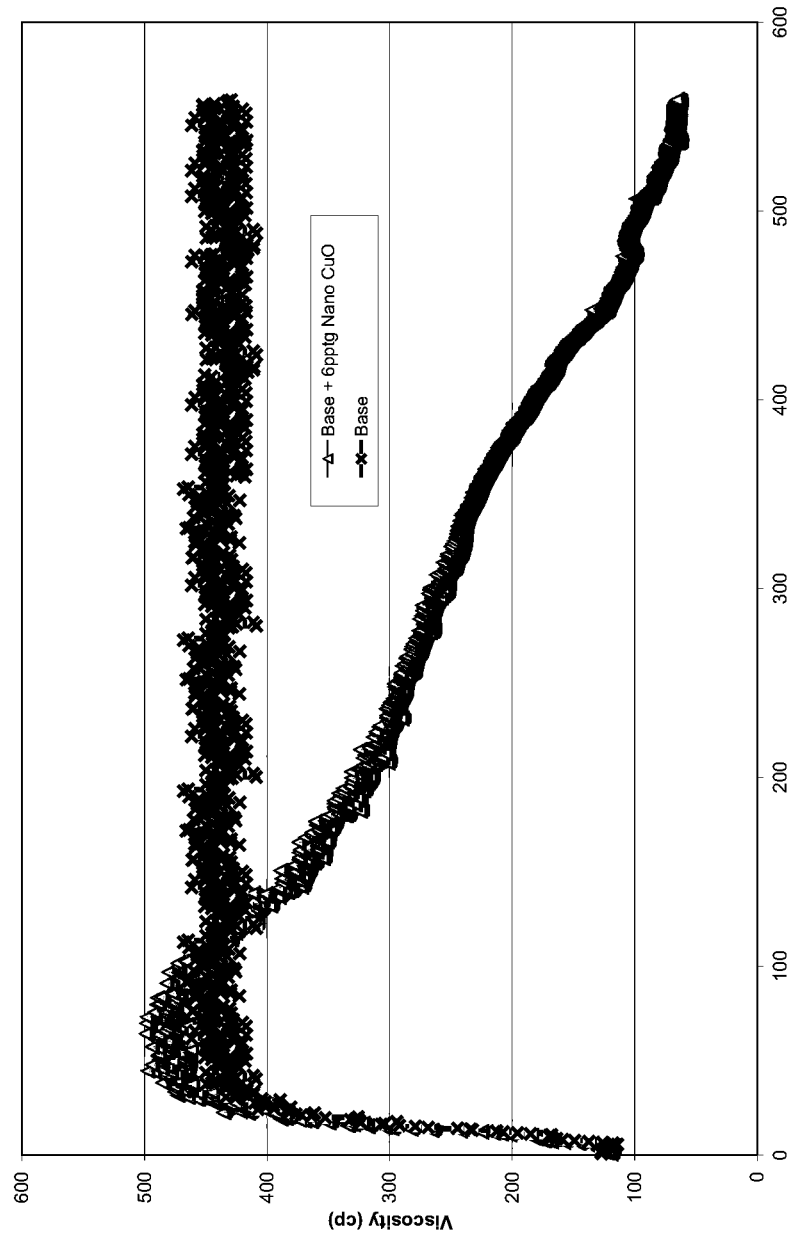

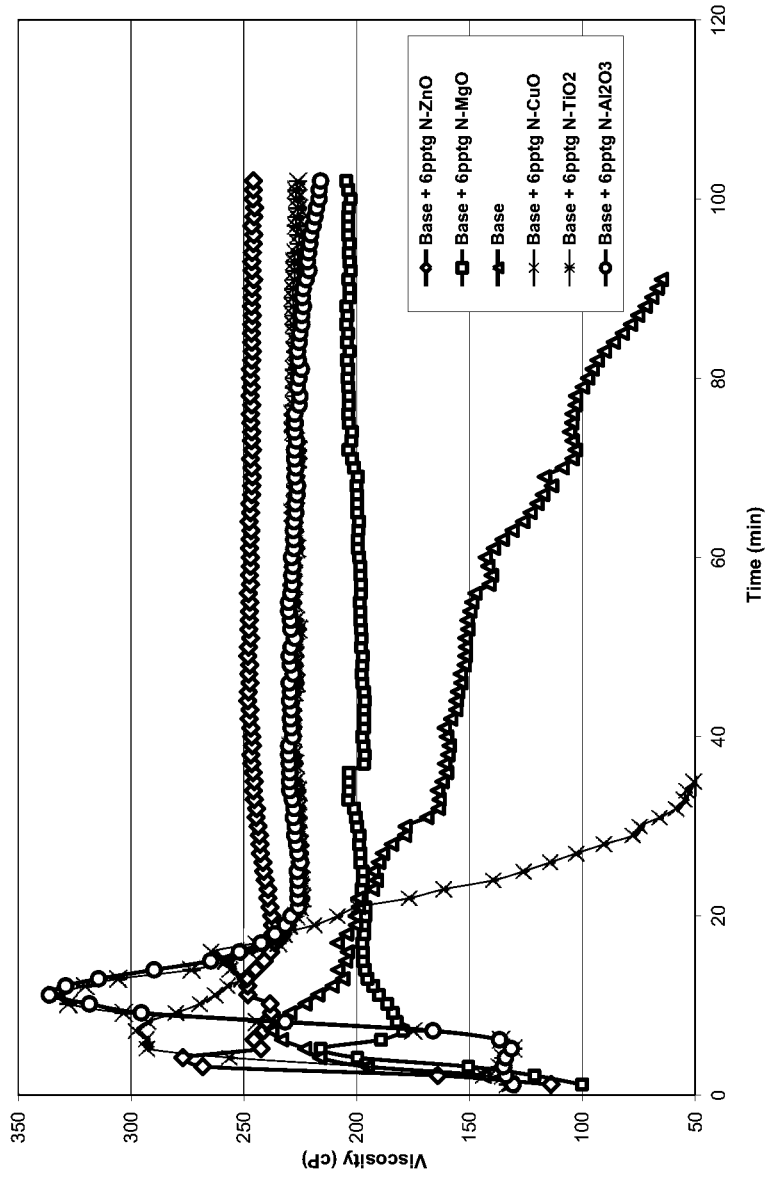
FIG. 2: Viscosities of VES fluids at 250°F and 100 1/s
Base Fluid: 13.0pptg $CaCl_2/CaBr_2$ + 4% WG-3L

BREAKING VISCOELASTIC SURFACTANT GELLED FLUIDS USING BREAKER NANOPARTICLES

TECHNICAL FIELD

The present invention relates to breaking or reducing the viscosity of gelled aqueous fluids containing viscoelastic surfactant (VES) gelling agents used during hydrocarbon recovery operations.

BACKGROUND

Hydraulic fracturing is a method of using pump rate and hydraulic pressure to fracture or crack a subterranean formation in a process for improving the recovery of hydrocarbons from the formation. Once the crack or cracks are made, high permeability proppant relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons. The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide, e.g. guar and derivatized guar polysaccharides, is used. The thickened or gelled fluid helps keep the proppants within the fluid. Gelling can be accomplished or improved by the use of crosslinking agents or cross-linkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "micro-gels" present in some polymer gelled carrier fluids will plug pore throats, leading to impaired leakoff and causing formation damage.

Aqueous drilling and treating fluids may be gelled or have their viscosity increased by the use of non-polymeric viscoelastic surfactants (VES). These VES materials are advantageous over the use of polymer gelling agents in that they do not leave a filter cake on the formation face, do not coat the proppant or create micro-gels or "fish-eyes", and have reduced potential for damaging the formation relative to polymers.

Some progress has been made toward developing internal breaker systems for the non-polymeric VES-based gelled fluids, that is, breaker systems that use products that are incorporated and solubilized within the VES-gelled fluid that are activated by downhole conditions that will allow a controlled rate of gel viscosity reduction over a rather short period of time of 1 to 24 hours or so similar to gel break times common for conventional crosslinked polymeric fluid systems (U.S. Pat. No. 7,696,134). The liquid breaker system for VES-gelled fluids, like fish oil, usually has short shelf time and is limited to use at harsh environments like deserts in middle east region.

It would be desirable if a viscosity breaking system could be devised that has a long shelf life and can be used at harsh environments to break the viscosity of fracturing and other well completion fluids gelled with and composed of viscoelastic surfactants.

SUMMARY

There is provided, in one form, a method for breaking the viscosity of a gelled aqueous fluid by adding breaker nanoparticles to the gelled aqueous fluid. The gelled aqueous fluid may include an aqueous base fluid gelled with at least one viscoelastic surfactant (VES). The breaker nanoparticles may be added to the gelled aqueous fluid in an effective amount to decrease the viscosity of the gelled aqueous fluid as compared to a gelled aqueous fluid absent the breaker nanoparticles.

In an alternative non-limiting embodiment, the effective amount of breaker nanoparticles added to the gelled aqueous fluid may range from about 0.1 pptg (pound per thousand gallon) to about 100 pptg. The VES may be or include, but is not limited to non-ionic, cationic, amphoteric, and zwitterionic surfactants and combinations thereof.

There is further provided in another embodiment, a fluid composition that may include an aqueous base fluid gelled with at least one viscoelastic surfactant (VES) in an amount effective to increase the viscosity of the aqueous base fluid, and breaker nanoparticles in an amount ranging from about 0.1 pptg to about 100 pptg, based on the total fluid composition, to decrease the viscosity of the gelled aqueous fluid. The breaker nanoparticles may be or include, but are not limited to inorganic semiconductor particles, organic semiconductor particles, and combinations thereof. The inorganic semiconductor particles may be or include, but are not limited to cupric oxide, cuprous oxide, silicon, silicon carbide, germanium, gallium arsenide, indium antimonide, gallium nitride, and combinations thereof. The organic semiconductor particles may be or include but are not limited to pentacene, anthracene, rubrene, poly(3-hexylthiophene), poly(p-phenylene vinylene), polypyrrole, polyaniline, and combinations thereof.

In an alternative embodiment of the fluid composition, the VES may be or include, but is not limited to non-ionic, cationic, amphoteric, zwitterionic surfactants, and combinations thereof.

The composition may aid in reducing the viscosity or breaking the gel of a gelled aqueous fluid having at least one VES.

BRIEF DESCRIPTION OF THE DRAWINGS

FIG. 1 is a graph illustrating the viscosity measured over time after adding nano-sized CuO particles to a gelled aqueous fluid having at least one VES at temperature 200° F.; and FIG. 2 is a graph illustrating the viscosity measured over time after adding different nano-sized particles to an aqueous base fluid gelled with at least one VES at temperature 250° F.

DETAILED DESCRIPTION

Adding breaker nanoparticles to a gelled aqueous fluid have been surprisingly found to reduce the viscosity of the gelled aqueous fluid. The breaker nanoparticles may be or include, but are not limited to inorganic semiconductor particles, organic semiconductor particles, and combinations thereof. The inorganic semiconductor particles may be or include, but are not limited to cupric oxide, cuprous oxide, silicon, silicon carbide, germanium, gallium arsenide, indium antimonide, gallium nitride and combinations thereof. The organic semiconductor particles may be or include but are not limited to pentacene, anthracene, rubrene, poly(3-hexylthiophene), poly(p-phenylene vinylene), polypyrrole, polyaniline, and combinations thereof. The breaker nanoparticles are stable and have a long shelf life when compared to liquid breakers for VES gelled fluids. The stability of the breaker nanoparticles will allow for them to be used even in harsh conditions, such as during hydrocarbon recovery in the Middle East. Heretofore, nanoparticles were only known to help stabilize VES-gelled aqueous fluids.

The breaker nanoparticles may be added to the gelled aqueous fluid in an effective amount to decrease the viscosity of the gelled aqueous fluid as compared to an aqueous gelled fluid absent the composition. In an alternative embodiment, the amount of breaker nanoparticles added to the gelled aqueous fluid may range from about 0.1 pptg independently to about 100 pptg, alternatively from about 1 pptg independently to about 50 pptg. The average size of the breaker nanoparticles may be less than about 1000 nm, or alternatively the size may range from about 1 nm independently to about 500 nm. As used herein with respect to a range, "independently" means that any lower threshold may be used together with any upper threshold to give a suitable alternative range.

In one non-limiting embodiment, the break time using the breaker nanoparticles internally may range from about 0.5 independently to about 72 hours, alternatively from about 1 independently to about 24 hours.

The gelled aqueous fluid may include, but is not limited to an aqueous base fluid gelled with at least one viscoelastic surfactant (i.e. surfactants that develop viscosity in aqueous brines by formation of rod- or worm-shaped micelle structures). The breaker nanoparticles can be added to the gel and put into solution during a VES-gel treatment as internal breakers, or the breaker nanoparticles can be added separately, if needed, as an external breaker solution to aid in removing VES gelled fluids already placed downhole. In a non-limiting embodiment, other additives may be added to the aqueous base fluid, such as but not limited to chelating agents, reducing agents, and combinations thereof. Chelating agents may be or include, but are not limited to carboxylic acids, aminocarboxylic acids, polyols, alkanolamines, and combinations thereof. Reducing agents may be or include, but are not limited to erythorbates, dehydroascorbates, citrates, ascorbates, sulfites, thiols, and alkali metal, alkaline earth metal and ammonium salts thereof.

'Breaker nanoparticles' are defined herein as nanoparticles that may reduce the viscosity of gelled aqueous fluids having at least one VES, or in other words 'break the gel'. Breaker nanoparticles are different from stabilizer nanoparticles in that stabilizer nanoparticles inhibit or prevent the degradation of at least one VES. Further examples of 'stabilizer nanoparticles' may be found in U.S. patent application Ser. No. 13/270,025 entitled 'Method to Complex Metals in Aqueous Treating Fluids for VES-Gelled Fluids', which is herein incorporated by reference.

Without wanting to limit the invention to any supposed theory or mechanism, the alteration that occurs in breaking the gelled aqueous fluid upon addition of the breaker nanoparticles is believed to be transition metal mediated and/or transition metal-catalyzed. The terms "metal-mediated" and "metal-catalyzed" are used herein as equivalent terms, and mean that a transition metal is needed for the reaction or sequence of reactions to occur, whether or not the exact mechanism is catalytic.

The terms "altered" and "alteration" are used herein to mean any change to the VES compound where it can no longer form, maintain or sustain viscous micelle structures. Thus, "altered" or "alteration" may include, but are not necessarily limited to: (i) a rearrangement of bonds on the VES, (ii) an addition to the VES (such as hydrogen, water molecule, etc.) or (iii) an elimination (decomposition or degradation) of the VES, e.g. where the VES after alteration now equals two or more other compounds.

In one non-limiting embodiment, the VES structure may be chemically altered by a redox reaction. That is, it is expected that both reduction and oxidation may occur in the reaction. A "redox" reaction is defined herein to be any reaction in which electrons are removed from one molecule or atom and given to another molecule or atom. In one embodiment, such redox reactions may be transition metal-mediated.

In most cases in the methods described herein, the alteration that occurs may not be complete; meaning not all of the VES (e.g. VES compounds such as Akzo Nobel Aromox APA-T) is altered; only a portion of the molecules has been altered. In practical terms, the alteration results in a ratio of altered to unaltered VES molecules. That is, typically a "broken VES fluid" is composed of a ratio of altered to unaltered VES molecules.

The ratio or amount of altered to unaltered VES molecules that cause VES gel break appears to be based on one or more of the following factors and possibly others: a. less altered VES is required to break the gel as fluid temperature increases; b. more altered VES is required to break the gel as VES (such as Aromox APA-T VES) loading increases; c. more altered VES is required to break the gel when VES counterions or stabilizing agents are used, including, but not necessarily limited to, $CaCl_2$, $CaBr_2$, MgO, $Ca(OH)_2$, $NH_4Cl$, salicylate, naphthalene sulfonate, phthalate, and the like.

In most cases it appears the VES (compounds such as Aromox APA-T) is predominantly altered into a non-VES surfactant compound or chemical species, for instance, a surfactant species that is not able to form viscous micelles (elongated or work-like micelle structures) or it remains predominantly a surfactant that has lost the ability to form VES micelles. In a non-limiting instance, the surfactants may only be able to form spherical micelles that do not impart added viscosity to the fluid. These theories are based on preliminary investigating and evaluating of the "residual material" that is sometimes left as a separate liquid phase after VES gel breaking occurs.

In some cases the altered VES may be the VES surfactant degraded to a hydrocarbon tail and a hydrophilic head. Thus, the term "decomposition" could be used for describing the breaking of the VES -gelled fluid, but "metal-mediated" and "alteration" of the VES are better terms for explaining the breaking phenomenon that occurs. As mentioned above, in most cases the VES compound is predominantly altered into a non-VES type surfactant. However, it may be understood that the surfactant (or surfactants or products) generated are not as soluble or as dispersible in water. That is, it has been found that the surfactant character of the products is overall less hydrophilic, and/or the Hydrophilic-Lipophilic Balance (HLB) appears to be altered, and the HLB number appears to be lower.

At this point it is still not clear what linkages or bonds are altered in the primary reactions that occur, whether the alteration occurs on the hydrocarbon tail or the surfactant head group. It is also uncertain what specific alterations occur, such as but not limited to electron addition, electron removal, hydrogenation (electron and proton addition), dehydrogenation (electron and proton removal). However, without being limited to any particular theory, it is suspected that the head group is the component that is chemically altered or modified. It is possible the head group is modified (by metal-mediated redox reactions) to have less solubility and/or dispersability in water, particularly brine (salt) water that is typically used for hydraulic fracturing operations.

The altered VES species appears to be associated with the unaltered VES and as the ratio of altered to unaltered VES increases, a point is reached where the amount of altered VES present does not allow the unaltered VES surfactant to remain organized in worm-like or rod shaped viscous micelle structures, and thereby alters the micelle by rearrangement and a complete viscosity break is achieved. As long as the ratio of altered to unaltered VES remains relatively low the viscosity break that occurs results in a uniphase fluid: a fluid that appears like water containing surfactants that do not yield viscosity, do not phase separate from the water, but give the water a slight color (such as straw yellow and light amber in some non-limiting cases) and the broken fluid easily foams when shaken in a bottle, and has a viscosity resembling water.

However, it has been observed that if the ratio of altered to unaltered VES becomes relatively high, such as when significant amounts of breaker products are used and very quick VES gel breaks are achieved, generating relatively high amounts of altered VES will result in the altered VES to phase out as a liquid from the water phase, and the unaltered VES portion also phases out with the altered portion. The phase separation seen from relatively fast VES gel break times appears to be due to a number of factors including, but not necessarily limited to, these listed which may act alone or in concert.
  a. The amount of altered VES generated.
  b. The apparent low HLB number of the altered VES species.
  c. Due to the apparent low HLB number it appears the altered VES wants to associate more with itself (like an oil) than with water.
  d. Low HLB number surfactants in general have less solubility and/or dispersability in water, particularly in brine water (i.e. water with dissolved salts present, such as KCl, NaCl, $CaCl_2$, $CaBr_2$, etc.).
  e. It also appears that the ratio of altered to unaltered VES may come to a point where the amount of unaltered VES present is not able to act as a hydrotrope and keep the low HLB number surfactant in solution and/or dispersed in the water phase.
  f. The unaltered VES phasing out with the altered VES surfactant species may possibly be due to the over abundance of altered VES surfactant species present combined with possibly having a strong attraction and interaction of the hydrocarbon tails that results in an oil-type break and surfactant liquid phasing out of the water phase.
  g. Lab tests have shown that the liquid surfactant layer that may phase out with fast breaking fluid compositions when shaken in a bottle with the mix water brine will temporarily disperse within the mix water for several minutes to several hours, depending on the ratio of altered to unaltered VES within the fluid-liquid surfactant layer.

Solubilizing, dispersing, and/or stabilizing the altered and unaltered VES from phasing out of the water phase can be enhanced by the use of solvents and hydrotropes, such as: glycerol, ethylene glycol and other glycols, methanol and other alcohols, ethylene glycol monobutyl ether and other glycol ethers, ethoxylated alcohols, alkyl glucosides, alkyl aromatic sulfonates, and the like, and combinations thereof. Solubilizing additive packages can be formulated to have enhanced performance compared to single component solvent or hydrotrope additive use. One preferred synergistic additive package art is disclosed in U.S. Pat. No. 7,655,603 filed May 9, 2006, incorporated herein by reference in its entirety.

The particular ratio of altered to unaltered VES appears to depend on a number of factors, some of which may have been identified. The ratio seems to depend primarily on the amount of breaker products used, more specifically the amount of both the reducing agent (if present) and the metal ions. The ratio appears to also depend on the fluid temperature, the type and amount of mix water salt VES loading, and the like, and combinations thereof.

Many viscoelastic surfactant (VES) fluid systems use aqueous base fluids, such as but not limited to a completion fluid or brine, as a mixwater for the fluid system. These aqueous base fluids may include sodium chloride, potassium chloride, calcium chloride, sodium bromide, zinc bromide, and/or calcium bromide brines.

The viscoelastic surfactants may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants, such as but not limited to APA-T, sold by Baker Hughes as SurFRAQ™ VES, have the potential to offer more gelling power per pound, making it less expensive than other fluids of this type. SurFRAQ™ is a VES liquid product that is 50% APA-T and 50% propylene glycol. Materials sold under U.S. Pat. No. 5,964,295 include ClearFRAC™, which may also comprise greater than 10% of a glycol. These viscoelastic surfactants are capable of gelling aqueous solutions to form a gelled base fluid. Diamond FRAQ™ which is a VES system, similar to SurFRAQ™, sold by Baker Hughes may also be used with the VES system. Other commonly known materials as Aromox APA-T manufactured by Akzo Nobel and other known viscoelastic surfactant gelling agents common to stimulation treatment of subterranean formations may also be used within the aqueous base fluid.

The amount of VES within the aqueous base fluid for subsequent formation of a gelled aqueous fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous base fluid in concentrations ranging from about 0.5% independently to about 25% by volume, alternatively up to about 12 vol % of the total gelled aqueous fluid (from about 5 gptg independently to about 120 gptg). In another non-limiting embodiment, the range for VES within the gelled aqueous fluid may be from about 1.0% independently to about 10.0% by volume VES. In an alternate embodiment, the amount of VES ranges from about 2% independently to about 6% by volume.

The breaker nanoparticles may be used in all VES applications including, but not limited to, VES-gelled friction reducers, VES viscosifiers for loss circulation pills, fracturing fluids, gravel packing fluids, viscosifiers used as diverters in acidizing, VES viscosifiers used to clean up drilling mud filter cake, perforating fluids, remedial clean-up of fluids after a VES treatment (post-VES treatment), and the like.

Any suitable mixing apparatus may be used to incorporate the breaker nanoparticles into a gelled aqueous fluid or an aqueous treating fluid. In the case of batch mixing, the VES and the aqueous base fluid are blended for a period of time sufficient to form a gelled or viscosified solution. The VES may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein in their entirety by reference.

Viscoelastic surfactants improve the fracturing (frac) fluid performance through the use of a polymer-free system. These systems offer improved viscosity breaking, higher sand transport capability, are more easily recovered after treatment, and are relatively non-damaging to the reservoir. The systems are also more easily mixed "on the fly" in field operations and do not require numerous co-additives in the fluid system, as do some prior systems.

The gelled aqueous fluid may be prepared by blending a VES into an aqueous base fluid. The aqueous base fluid could be, for example, water, brine, aqueous-based foams or water-alcohol mixtures. Any suitable mixing apparatus may be used for this procedure. In the case of batch mixing, the VES and the aqueous base fluid are blended for a period of time sufficient to form a gelled or viscosified solution. The breaker nanoparticles may be added to the aqueous base fluid after the VES has been mixed with the aqueous base fluid.

Propping agents are typically added to the aqueous base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 pound per gallon independently to 14 pounds per gallon (120-1700 kg/m$^3$) of fracturing fluid, but higher or lower concentrations can be used as the fracture design required. The size of propping agents is usually from about 100 mesh (149 microns) to about 10 mesh (2000 microns). The aqueous base fluid may also contain other conventional additives common to the well service industry such as water wetting surfactants, non-emulsifiers and the like.

In a typical fracturing operation, the fracturing fluid is pumped at a rate sufficient to initiate and propagate a fracture in the formation and to place propping agents into the fracture. A typical fracturing treatment would be conducted by mixing a 20.0 to 60.0 gallon/1000 gallon water (volume/volume-the same values may be used with any SI volume unit, e.g. 60.0 liters/-1000 liters) of a VES, such as SurFRAQ™ in a non-limiting embodiment, in a 2% (w/v) (166 lb/1000 gal, 19.9 kg/m$^3$) KCl solution at a pH ranging from about 6.0 to about 8.0.

There is provided, in one form, a method for breaking the viscosity of a gelled aqueous fluid by adding breaker nanoparticles to the gelled aqueous fluid. The method may be effective at temperatures ranging from about 100° F. independently to about 350° F., or from about 150° F. independently to about 300° F. in another non-limiting embodiment. The method may be effective at pressures ranging from about 1000 psi independently to about 35,000 psi, or alternatively from 5000 psi independently to about 25000 psi.

The invention will be further described with respect to the following non-limiting Examples which are not meant to limit the invention, but rather to further illustrate the various embodiments.

EXAMPLE 1

FIG. 1 is a graph illustrating the viscosity measured over time after adding 6 pptg (pounds per thousand gallon) nano-sized CuO particles (i.e. breaker nanoparticles) to an aqueous fluid gelled with at least one VES at a temperature of 200° F. The aqueous base fluid was 4% Aromox APA-T manufactured by Akzo Nobel in 12.0 ppg (pounds per gallon) CaCl$_2$/CaBr$_2$; the gelled aqueous fluid is noted on the graph as 'Base' fluid. As represented by the graph, the addition of the nano-sized CuO particles to the base fluid reduced the viscosity of the fluid over a period of time.

EXAMPLE 2

FIG. 2 is a graph illustrating the viscosity measured over time after adding various types of nano-sized particles. The nano-sized particles were loaded into an aqueous fluid in an amount of 6 pptg where the aqueous fluid was gelled with at least one VES at a temperature of 250° F. The aqueous fluid was 4% Aromox APA-T manufactured by Akzo Nobel in 13.0 ppg (pounds per gallon) CaCl$_2$/CaBr$_2$; the gelled aqueous fluid is noted on the graph as 'Base' fluid. As represented by the graph, nano-sized ZnO, nano-sized MgO, nano-sized TiO$_2$, nano-sized Al$_2$O$_3$ act as stabilizer nanoparticles when added to the base fluid, i.e. these stabilizer nanoparticles allow the base fluid to maintain a higher viscosity over a longer period of time and thereby stabilize the viscosity of the base fluid. Also represented by the graph, the nano-sized CuO acts as a breaker for the base fluid in contrast to the other types of metal oxide nanoparticles.

In the foregoing specification, the invention has been described with reference to specific embodiments thereof, and has been described as effective in providing methods and compositions for breaking the viscosity of a gelled aqueous fluid by adding breaker nanoparticles to the gelled aqueous fluid in an effective amount to decrease the viscosity of the gelled aqueous fluid. Accordingly, the specification is to be regarded in an illustrative rather than a restrictive sense. For example, aqueous base fluids, viscoelastic surfactants, and breaker nanoparticles falling within the claimed parameters, but not specifically identified or tried in a particular method, are expected to be within the scope of this invention.

The present invention may suitably comprise, consist or consist essentially of the elements disclosed and may be practiced in the absence of an element not disclosed. For instance, the methods may consist of or consist essentially of breaking the viscosity of a gelled aqueous fluid by adding breaker nanoparticles to the gelled aqueous fluid in an effective amount to decrease the viscosity of the gelled aqueous fluid. Alternatively, a fluid composition may consist of or consist essentially of a gelled aqueous fluid comprising an aqueous base fluid gelled with at least one VES in an amount effective to increase the viscosity of the aqueous base fluid and breaker nanoparticles in an effective amount to decrease the viscosity of the gelled aqueous fluid.

The words "comprising" and "comprises" as used throughout the claims, are to be interpreted to mean "including but not limited to" and "includes but not limited to", respectively.

What is claimed is:

1. A method for breaking the viscosity of a gelled aqueous fluid where the gelled aqueous fluid comprises an aqueous fluid gelled with at least one viscoelastic surfactant (VES), wherein the method comprises adding breaker nanoparticles to a gelled aqueous fluid, wherein the breaker nanoparticles are added to the gelled aqueous fluid in an effective amount to decrease the viscosity of the gelled aqueous fluid as compared to a gelled aqueous fluid absent the breaker nanoparticles; and wherein the breaker nanoparticles are selected from the group consisting of cupric oxide, cuprous oxide, inorganic semiconductors, organic semiconductors, and combinations thereof.

2. The method of claim 1, wherein the inorganic semiconductors selected from the group consisting of silicon, silicon carbide, germanium, gallium arsenide, indium antimonide, gallium nitride, and combinations thereof; wherein the organic semiconductors selected from the group consisting of pentacene, anthracene, rubrene, poly(3-hexylthiophene), poly(p-phenylene vinylene), polypyrrole, polyaniline, and combinations thereof.

3. The method of claim 1, wherein the effective amount of the breaker nanoparticles added to the gelled aqueous fluid ranges from about 0.1pptg to about 100 pptg.

4. The method of claim 1, wherein the average size of the breaker nanoparticles is less than about 1000 nm.

5. The method of claim 1, wherein the VES is selected from the group consisting of non-ionic, cationic, amphoteric, and zwitterionic surfactants and combinations thereof.

6. The method of claim 1, wherein the VES surfactant is selected from the group consisting of quaternary ammonium salts, amidoamine oxides, dihydroxyl alkyl glycinate; alkyl ampho acetate or propionate; alkyl betaine; alkyl amidopropyl betaine and alkylimino mono- or di-propionates derived from certain waxes, fats and oils; and combinations thereof.

7. A method for breaking the viscosity of a gelled aqueous fluid where the gelled aqueous fluid comprises an aqueous base fluid gelled with at least one viscoelastic surfactant (VES), wherein the method comprises adding breaker nanoparticles to the gelled aqueous fluid in an amount ranging from about 0.1 pptg to about 100 pptg to decrease the viscosity of the gelled aqueous fluid; and wherein the breaker nanoparticles are selected from the group consisting of cupric oxide, cuprous oxide, inorganic semiconductors, organic semiconductors, and combinations thereof; wherein the inorganic semiconductors selected from the group consisting of silicon, silicon carbide, germanium, gallium arsenide, indium antimonide, gallium nitride, and combinations thereof; wherein the organic semiconductors selected from the group consisting of pentacene, anthracene, rubrene, poly(3-hexylthiophene), poly(p-phenylene vinylene), polypyrrole, polyaniline, and combinations; and wherein the VES is selected from the group consisting of non-ionic, cationic, amphoteric, and zwitterionic surfactants and combinations thereof.

8. The method of claim 7, wherein the average size of the breaker nanoparticles is less than about 1000 nm.

9. The method of claim 7, wherein the VES surfactant is selected from the group consisting of quaternary ammonium salts, amidoamine oxides, dihydroxyl alkyl glycinate; alkyl ampho acetate or propionate; alkyl betaine; alkyl amidopropyl betaine and alkylimino mono- or di-propionates derived from certain waxes, fats and oils; and combinations thereof.

* * * * *